J. M. FLEMING.
BUTTER SEPARATOR.
APPLICATION FILED JULY 10, 1908.
905,302.
Patented Dec. 1, 1908.
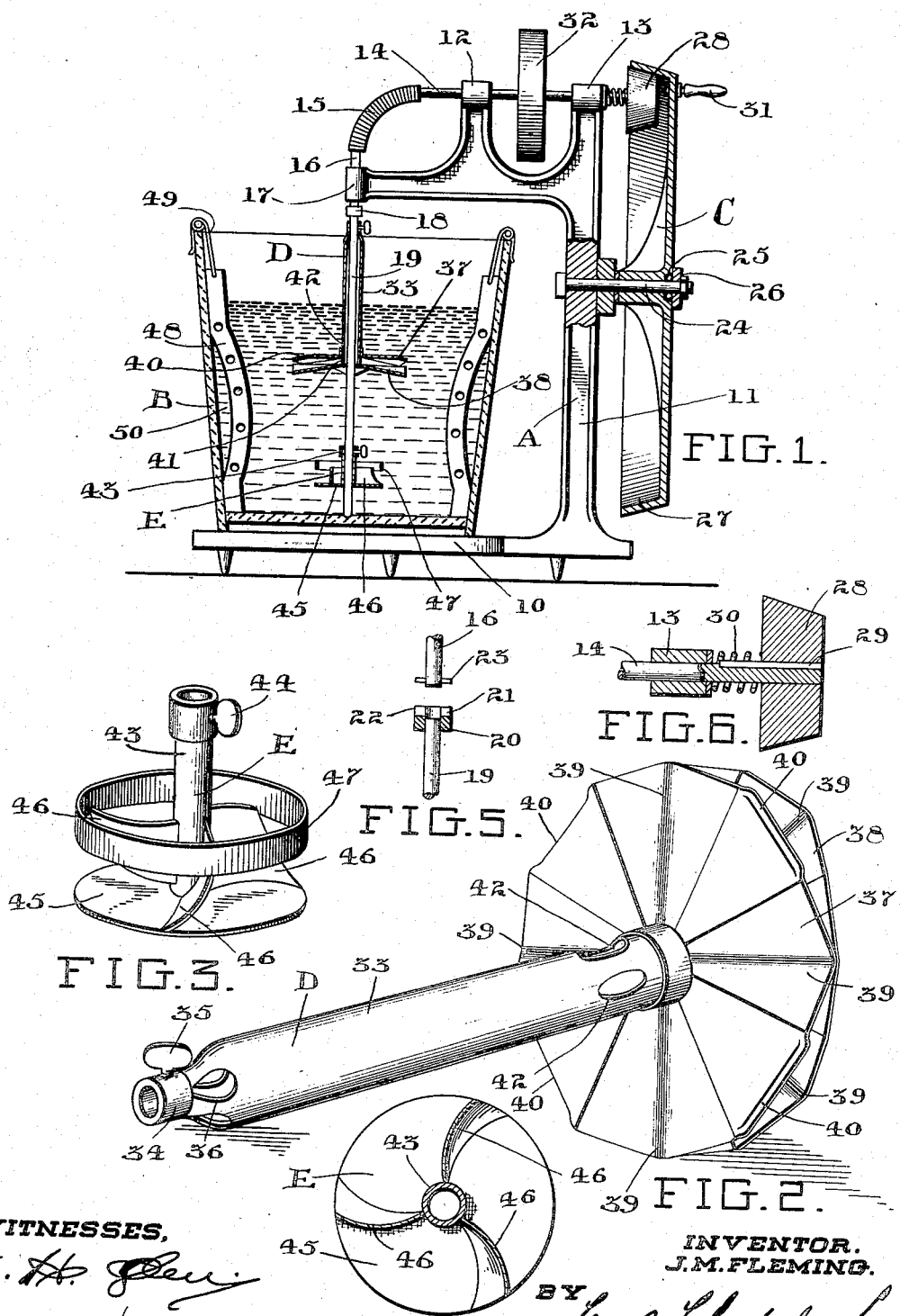

UNITED STATES PATENT OFFICE.

JOHN MILLER FLEMING, OF OTTAWA, ONTARIO, CANADA.

BUTTER-SEPARATOR.

No. 905,302.　　　Specification of Letters Patent.　　　Patented Dec. 1, 1908.

Application filed July 10, 1908. Serial No. 442,987.

*To all whom it may concern:*

Be it known that I, JOHN MILLER FLEMING, of the city of Ottawa, in the county of Carleton, Province of Ontario, Canada, have invented certain new and useful Improvements in Butter - Separators, of which the following is a specification.

My invention relates to improvements in butter separators of the type in which the butter is separated from the milk or cream by combined agitation and aeration, effected through the medium of a rapidly rotating dasher, and the objects of the invention are to provide improved means for driving the dasher and for effecting a better circulation of the milk or cream, to increase the effectiveness of the dasher. The form of dasher commonly employed in this type of separator draws the air downwardly from the top and distributes it to the sides of the tub or container of the milk and cream.

In the present invention, apertures are provided in the central part of the dasher of sufficient size to permit the milk or cream to be drawn centrally into the dasher and carried along with the downgoing stream of air, thereby creating an additional draft for the air and more thoroughly commingling therewith. In order to further increase the efficiency of the circulation a turbine member is provided below the dasher adapted to create a current of liquid towards the same.

The invention is described more fully in the accompanying specifications and drawings, in which, Figure 1 is a vertical section through the butter separator. Fig. 2 is a perspective view of the dasher. Fig. 3 is a perspective view of the turbine member. Fig. 4 is a transverse section through the turbine member. Fig. 5 is a detail of the coupling for the shaft. Fig. 6 is a sectional detail of the driving pinion.

In the drawings, like letters of reference indicate corresponding parts in each figure.

Referring to the drawings, A represents the frame of suitable construction, including a base 10 adapted to support the tub B or other container for the milk or cream, and a standard 11 having bearings 12 and 13 at the top thereof, supporting a horizontal shaft 14. This shaft 14 is connected by a short piece of flexible shafting 15, with a vertically-extending shaft 16, slidably journaled in the bearings 17, and connected by a releasable coupling 18 with the shaft 19, which extends in the tub and has the lower end thereof stepped in the bottom of the tub.

The coupling 18 may be of any desired form, and the form illustrated includes a collar 20 secured to the top of the lower shaft having recesses 21 and 22 therein, into which a pin 23 on the upper shaft extends.

In accordance with the present invention, a friction driving mechanism is provided for actuating the shaft 19 and this includes a main driving wheel C, supported from a stepped shaft 24 extending through the standards, preferably having a set of ball bearings 25 around the outer end adapted to reduce the friction of the driving wheel against the collar 26 on the end of the shaft.

The driving wheel C is formed on the periphery, with an inclined flange 27 which is engaged by a conoidal pinion 28 which rotates with the shaft 14 and is longitudinally adjustable therein, this being accomplished by providing a key 29 in the shaft or other suitable means.

The pinion is preferably made, formed of fiber or other material, which will give a good friction grip against the flange 27, and it is held in resilient contact with said flange by means of a compression spring 30, abutting the same and the bearing 13.

For convenience in turning the large wheel C a handle 31 may be provided, and in order to steady the shaft 14 a balance wheel 32 is preferably inserted between bearings 12 and 13.

D represents the combined aerating and agitating dasher, which may be of any suitable form now in common use. In the form illustrated, this dasher includes a cylindrical portion 33 having a collar 34 at the top thereof, through which the clamping set-screw 35 extends, a plurality of apertures 36 being provided adjacent to the collar, and through which air may enter into the tubular portion.

The bottom of the dasher is formed of two disks 37 and 38, each of which are provided with a plurality of depressed portions 39, which are located opposite the straight portions of the other disk, the edges of the straight portions on the upper disk being formed with a downwardly inclined flange 40 adapted to direct the outgoing stream of air downwardly. The tubular portion permits the air to pass between the disks through suitable apertures 41 formed therein.

In accordance with the present invention, a plurality of relatively large apertures 42 are provided in the side of the tubular portion, near the bottom thereof, but above the disks 37, the said apertures being sufficiently large to permit a considerable stream of the milk or cream to be drawn into the interior of the dasher, by the air passing therethrough. This stream creates a further draft through the dasher.

To more thoroughly effect the circulation of the milk or cream during separation, and to prevent any of the milk or cream at the bottom of the tub, remaining out of circulation, a turbine member E is provided on the shaft, this, in the embodiment illustrated, including a tubular portion 43, clamped to the shaft 19, by a suitable set-screw 44, a bottom disk 45 having a plurality of turbine blades 46 thereon adapted, when the turbine member is rotated, to direct the stream of liquid upwardly, and an annular member 47 connected to the top edge of the blades, and extending upwardly above the same, adapted to give direction to the current of liquid created by the turbine blades.

To increase the agitation of the liquid, interrupters 48 are provided supported by spring clips 49 from the top of the tub, and being formed with outwardly bowed central portions 50 leaving a space immediately adjacent to the tub, through which the liquid may flow.

In operation, the tub is nearly filled with sweet or sour milk or cream, and the dasher adjusted until the disks thereon are a few inches below the surface of the liquid. The turbine member E is then adjusted until it is a few inches from the bottom and then the shaft 19 carrying the dasher and turbine member is rapidly rotated through the medium of the driving wheel C.

The rotation of the dasher, as well as causing agitation of the liquid, will create a vacuum upon each of the depressed portions in the disk, and this will suck the air downwardly through the central portion of the dasher and distribute it out at the periphery of the disks. Liquid will also be drawn through the apertures 42 by the centrifugal force, which discharged it outwardly through the disks, and this will suck further air down and distribute the same.

The turbine member E maintains a continuous current from the bottom upwardly and thus, it is insured that all parts of the liquid are subjected to the action of the agitator and aerator.

The operation will be completed within about seven or eight minutes, the temperatures at which the process should be carried out and the mode of collecting the butter from the milk or cream being now well known to those skilled in the art.

As many changes could be made in the above construction, and many apparently widely-different embodiments of my invention could be made without departing from the spirit or scope thereof, it is intended that all matter contained in these specifications and drawings shall be interpreted as illustrative and not in a limiting sense. It is also to be understood that the language of the following claims is intended to cover such generic and specific features of the invention herein described, which, as a matter of language, might be said to be included thereby.

What I claim as my invention is:

1. In a butter separator, a hollow, aerating dasher, having the top in communication with the open air and having means for drawing the air downwardly and distributing the same through the milk, together with relatively large apertures adapted to permit a portion of the milk or cream to flow into the interior of the dasher, and be distributed by the centrifugal force thereby increasing the draft of the air.

2. In a butter separator, the combination with the aerating agitator, of a turbine member below the same adapted to create an upward current of liquid.

3. In a butter separator, the combination with the aerating dasher, of a turbine member below the same, formed with a plurality of wings adapted to create an upward current of liquid and an annular directing member about said wings.

4. In a butter separator, the combination with the aerating dasher, of a turbine member below the same, including a disk having a plurality of wings on the upper side thereof adapted to create an upward current of liquid.

5. In a butter separator, the combination with a receptacle, of a shaft therein, means for driving the same, an aerating dasher adjustable on the shaft, a turbine member below the same also adjustable on the shaft, and adapted to create an upward current in the liquid.

In witness whereof I have hereunto set my hand in the presence of two witnesses.

JOHN MILLER FLEMING.

Witnesses:
RUSSEL S. SMART,
J. H. GLEN.